US010356871B2

(12) United States Patent
Lewis

(10) Patent No.: US 10,356,871 B2
(45) Date of Patent: *Jul. 16, 2019

(54) METHOD AND SYSTEM FOR IMPLEMENTING TRANSIENT STATE COMPUTING WITH OPTICS

(71) Applicant: CenturyLink Intellectual Property LLC, Broomfield, CO (US)

(72) Inventor: Ronald A. Lewis, Bastrop, LA (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/132,108

(22) Filed: Sep. 14, 2018

(65) Prior Publication Data

US 2019/0014637 A1 Jan. 10, 2019

Related U.S. Application Data

(63) Continuation of application No. 15/853,337, filed on Dec. 22, 2017, now Pat. No. 10,085,321.

(60) Provisional application No. 62/526,239, filed on Jun. 28, 2017.

(51) Int. Cl.

| | |
|---|---|
| ***H05B 33/08*** | (2006.01) |
| ***G06N 99/00*** | (2019.01) |
| ***G06N 10/00*** | (2019.01) |
| ***G06E 3/00*** | (2006.01) |

(52) U.S. Cl.

CPC .......... *H05B 33/0869* (2013.01); *G06E 3/00* (2013.01); *G06N 10/00* (2019.01)

(58) Field of Classification Search

CPC ........... H05B 33/0815; H05B 33/0818; H05B 41/2828; H05B 41/3921; H05B 41/3927; H05B 41/28; H05B 37/029; H05B 33/0803; H05B 37/0254; H05B 37/02

See application file for complete search history.

(56) References Cited

U.S. PATENT DOCUMENTS

| | | | | |
|---|---|---|---|---|
| 10,085,321 | B1 * | 9/2018 | Lewis | H05B 33/0869 |
| 2012/0250095 | A1 | 10/2012 | Bestmann | |
| 2014/0250778 | A1 | 9/2014 | Suntych | |
| 2015/0022110 | A1 | 1/2015 | Sisto | |

(Continued)

*Primary Examiner* — Minh D A

(57) ABSTRACT

Novel tools and techniques are provided for implementing computing, and, more particularly, to methods, systems, and apparatuses for implementing transient state computing with optics. In various embodiments, a chromatic transient state computing system might receive one or more input values and might assign a "chromabit value" to each of the one or more input values. The chromatic transient state computing system might include a plurality of sets of colored light emitting diodes ("LEDs") and a corresponding set of photoreceptors. Each distinguishable color as detected by one of the photoreceptors might correspond to a combination of colors emitted by a set of colored LEDs, each distinguishable color representing a chromabit value. The chromatic transient state computing system might perform a computing operation using the assigned chromabit values each corresponding to each of the one or more input values, and might output one or more output values resulting from the computing operation.

20 Claims, 7 Drawing Sheets

(56) References Cited

U.S. PATENT DOCUMENTS

| | | | |
|---|---|---|---|
| 2015/0296589 | A1 | 10/2015 | Melanson |
| 2016/0023017 | A1 | 1/2016 | Moore-Ede |

* cited by examiner

100

200

200'

500'

500

METHOD AND SYSTEM FOR IMPLEMENTING TRANSIENT STATE COMPUTING WITH OPTICS

CROSS-REFERENCES TO RELATED APPLICATIONS

This application is a continuation of U.S. patent application Ser. No. 15/853,337 (the "'337 Application"), filed Dec. 22, 2017 by Ronald A. Lewis, entitled, "Method and System for Implementing Transient State Computing with Optics," which claims priority to U.S. patent application Ser. No. 62/526,239 (the "'239 Application"), filed Jun. 28, 2017 by Ronald A. Lewis, entitled, "Transient State Computing with Optics," the entire teachings of which are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing computing, and, more particularly, to methods, systems, and apparatuses for implementing transient state computing with optics.

BACKGROUND

Conventional computing devices (such as silicon-based computing devices or the like) utilize computing logic using two states (which are represented by binary values "0" and "1"). Such binary computing devices require a large array of arithmetic logic units ("ALUs"), each performing bitwise logic operations or the like, to compute large computational problems. Power and heat issues arise when such binary computing devices are scaled up in attempts to increase computational capabilities. In efforts to overcome the limitations of binary computing devices, several groups and entities have researched or developed quantum computing systems, which are based on qubits that reflect quantum states. Although quantum computing systems utilize more than two states, conventional quantum computing systems (which are potentially capable of using far less power than binary computing devices) are costly to manufacture, costly to operate (e.g., some quantum computing systems require power to cool a qubit to 10 times colder than interstellar space in order to tip a qubit or to change states, etc.), currently difficult to scale-up, and have issues related to detection of state (i.e., in the process of detecting the state of a qubit, the very state of the qubit might change due to quantum mechanical effects).

Hence, there is a need for more robust and scalable solutions for implementing computing, and, more particularly, to methods, systems, and apparatuses for implementing transient state computing with optics.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
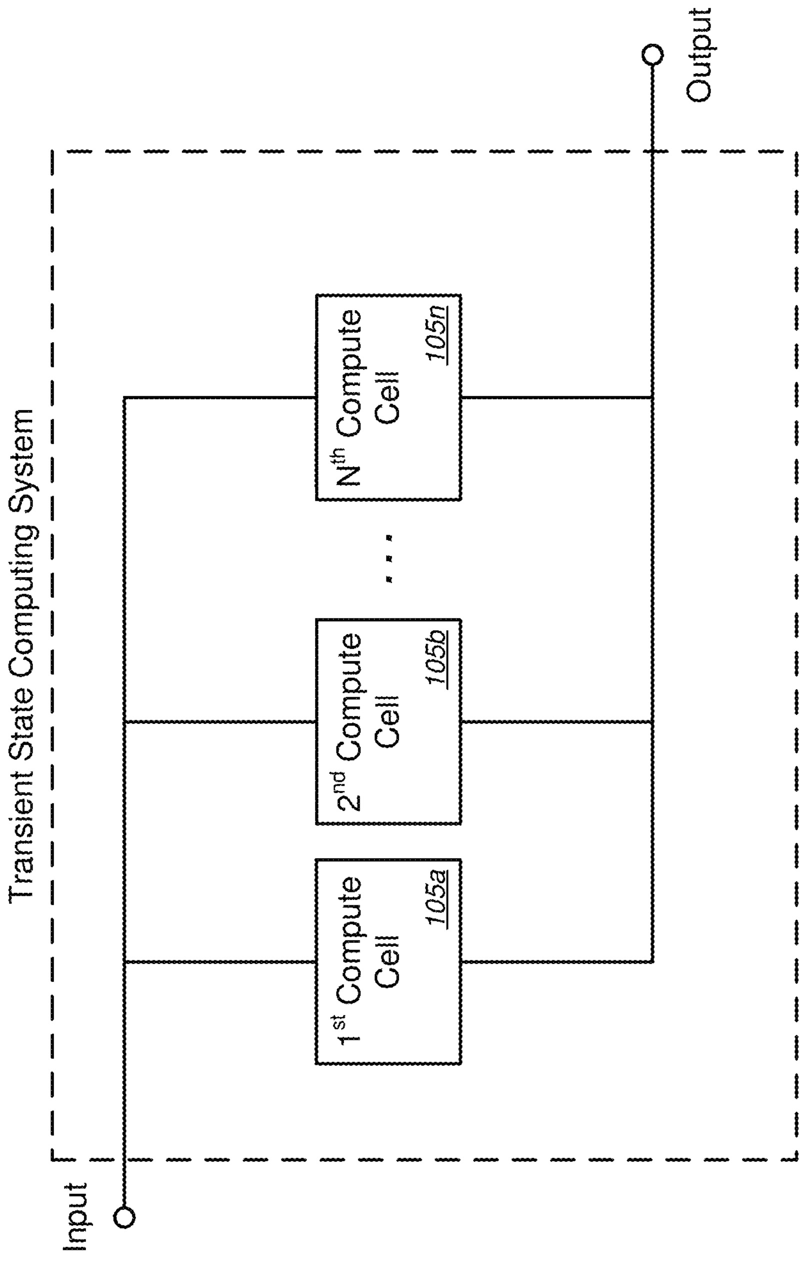
FIG. 1 is a schematic diagram illustrating a system for implementing transient state computing with optics, in accordance with various embodiments.

Various embodiments provide tools and techniques for implementing computing, and, more particularly, to methods, systems, and apparatuses for implementing transient state computing with optics.

In various embodiments, a chromatic transient state computing system might receive one or more input values and might assign a chromabit value to each of the one or more input values. The chromatic transient state computing system might include a plurality of sets of colored light emitting diodes ("LEDs") and a corresponding set of photoreceptors. Each distinguishable color as detected by one of the photoreceptors might correspond to a combination of colors emitted by a set of colored LEDs, each distinguishable color representing a chromabit value. The chromatic transient state computing system might perform a computing operation using the assigned chromabit values each corresponding to each of the one or more input values, and might output one or more output values resulting from the computing operation.

In some embodiments, each set of colored LEDs might comprise three differently colored LEDs. In some cases, the three differently colored LEDs might comprise a red LED, a yellow LED, and a blue LED. In some instances, each set of colored LEDs might represent 8 possible states, each possible state representing a possible chromabit value.

According to some embodiments, intensity of each colored LED might be controllable based on input current. The range of light intensity produced by changing input current to each colored LED might result in a series of distinguishable colors each representing a chromabit value. In some cases, each set of colored LEDs might represent 216 possible states, each possible state representing a possible chromabit value. Alternatively, each set of colored LEDs might represent 4,096 possible states, each possible state representing a possible chromabit value. In yet other alternative embodiments, each set of colored LEDs might represent 16,777,216 possible states, each possible state representing a possible chromabit value.

Merely by way of example, in some embodiments, each set of colored LEDs might comprise four or more of a red LED, an orange LED, a yellow LED, a green LED, a cyan LED, a blue LED, or a violet LED, and/or the like. According to some embodiments, the photoreceptors might each comprise one of a phototransistor or a set of photoresistors and an array of transistors, and/or the like.

The potential of such chromatic transient state computing systems as described herein (e.g., with respect to FIGS. 1-6) vastly overshadow the capabilities of conventional binary computing systems, as well as quantum computing systems (which although having more states than binary systems present issues including, but not limited to, cost in manufacturing, cost to operate (e.g., some quantum computing systems require power to cool a qubit to 10 times colder than interstellar space in order to tip a qubit or to change states, etc.), scalability, issues with detection that might affect states, etc.). In contrast to quantum computing systems, chromatic transient state computing systems can use existing parts (e.g., LEDs, photoreceptors, common electronic circuit components, etc.), thus allowing for low-cost, low-power, scalable high-level computing solutions. More importantly, the chromatic transient state computing system described herein (also referred to as a "photo-optic CPU"), requires significantly less power compared with both conventional binary computing systems and currently available quantum computing systems, while providing the capability of using existing logic while also maintaining multiple Boolean states simultaneously. In some cases, individual LEDs might be used in the circuit to produce the chromatic transient state computing device. Alternatively, surface-mount device ("SMD") LEDs might be used instead, thereby further decreasing the size or footprint of each compute cell. Custom designs using SMD LEDs might also be utilized.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, computing technology, and/or the like. In other aspects, certain embodiments, can improve the functioning of computing systems themselves (e.g., computing systems, etc.), for example, by receiving, with a chromatic transient state computing system, one or more input values; assigning, with the chromatic transient state computing system, a chromabit value to each of the one or more input values, wherein the chromatic transient state computing system comprises a plurality of sets of colored light emitting diodes ("LEDs") and a corresponding set of photoreceptors, wherein each distinguishable color as detected by one of the photoreceptors corresponds to a combination of colors emitted by a set of colored LEDs, each distinguishable color representing a chromabit value; performing, with the chromatic transient state computing system, a computing operation using the assigned chromabit values each corresponding to each of the one or more input values; and outputting, with the chromatic transient state computing system, one or more output values resulting from the computing operation; and/or the like. In particular, to the extent any abstract concepts are present in the various embodiments, those concepts can be implemented as described herein by devices, software, systems, and methods that involve specific novel functionality (e.g., steps or operations), such as, increasing the computational capacity of a computing system by utilizing the transient states of colored LEDs, and/or the like, to name a few examples, that extend beyond mere conventional computer processing operations (which are limited to the two states of conventional binary computing systems). These functionalities can produce tangible results outside of the implementing computer system, including, merely by way of example, increasing the computational capacity of computing systems, and/or the like, at least some of which may be observed or measured by customers and/or service providers.

In an aspect, a method might comprise receiving, with a chromatic transient state computing system, one or more input values. The method might further comprise assigning, with the chromatic transient state computing system, a chromabit value to each of the one or more input values. The chromatic transient state computing system might comprise a plurality of sets of colored light emitting diodes ("LEDs") and a corresponding set of photoreceptors. Each distinguishable color as detected by one of the photoreceptors corresponds to a combination of colors emitted by a set of colored LEDs, each distinguishable color representing a chromabit value. The method might also comprise performing, with the chromatic transient state computing system, a computing operation using the assigned chromabit values each corresponding to each of the one or more input values. The method might further comprise outputting, with the chromatic transient state computing system, one or more output values resulting from the computing operation.

In some embodiments, each set of colored LEDs might comprise three differently colored LEDs. In some cases, the three differently colored LEDs might comprise a red LED, a yellow LED, and a blue LED. In some instances, each set of colored LEDs might represent 8 possible states, each possible state representing a possible chromabit value.

According to some embodiments, intensity of each colored LED might be controllable based on input current. The range of light intensity produced by changing input current to each colored LED might result in a series of distinguishable colors each representing a chromabit value. In some cases, each set of colored LEDs might represent 216 possible states, each possible state representing a possible chromabit value. Alternatively, each set of colored LEDs might represent 4,096 possible states, each possible state representing a possible chromabit value. In yet other alternative embodiments, each set of colored LEDs might represent 16,777,216 possible states, each possible state representing a possible chromabit value.

Merely by way of example, in some embodiments, each set of colored LEDs might comprise four or more of a red LED, an orange LED, a yellow LED, a green LED, a cyan LED, a blue LED, or a violet LED, and/or the like. According to some embodiments, the photoreceptors might each comprise one of a phototransistor or a set of photoresistors and an array of transistors, and/or the like.

In another aspect, a chromatic transient state computing system might comprise a plurality of sets of colored light emitting diodes ("LEDs") and a corresponding set of photoreceptors. A set of computing instructions might cause the chromatic transient state computing system to: receive one or more input values; assign a chromabit value to each of the one or more input values, wherein each distinguishable color as detected by one of the photoreceptors corresponds to a combination of colors emitted by a set of colored LEDs, each distinguishable color representing a chromabit value; perform a computing operation using the assigned chromabit values each corresponding to each of the one or more input values; and output one or more output values resulting from the computing operation.

In some embodiments, each set of colored LEDs might comprise three differently colored LEDs. In some cases, the three differently colored LEDs might comprise a red LED, a yellow LED, and a blue LED. In some instances, each set of colored LEDs might represent 8 possible states, each possible state representing a possible chromabit value.

According to some embodiments, intensity of each colored LED might be controllable based on input current. The range of light intensity produced by changing input current to each colored LED might result in a series of distinguishable colors each representing a chromabit value. In some cases, each set of colored LEDs might represent 216 possible states, each possible state representing a possible chromabit value. Alternatively, each set of colored LEDs might represent 4,096 possible states, each possible state representing a possible chromabit value. In yet other alternative embodiments, each set of colored LEDs might represent 16,777,216 possible states, each possible state representing a possible chromabit value.

Merely by way of example, in some embodiments, each set of colored LEDs might comprise four or more of a red LED, an orange LED, a yellow LED, a green LED, a cyan LED, a blue LED, or a violet LED, and/or the like. According to some embodiments, the photoreceptors might each comprise one of a phototransistor or a set of photoresistors and an array of transistors, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing computing, and, more particularly, to methods, systems, and apparatuses for implementing transient state computing with optics, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing transient state computing with optics, in accordance with various embodiments.

In the non-limiting embodiment of FIG. 1, a chromatic transient state computing system 100 might comprise a plurality of compute cells 105, including, without limitation, a first compute cell 105*a*, a second compute cell 105*b*, through an $N^{th}$ compute cell 105*n*. Each compute cell 105 might receive one or more input values, might assign a chromabit value to each of the one or more input values, might perform a computing operation using the assigned chromabit values each corresponding to each of the one or more input values, and might output one or more output values resulting from the computing operation.

Figure 2A:
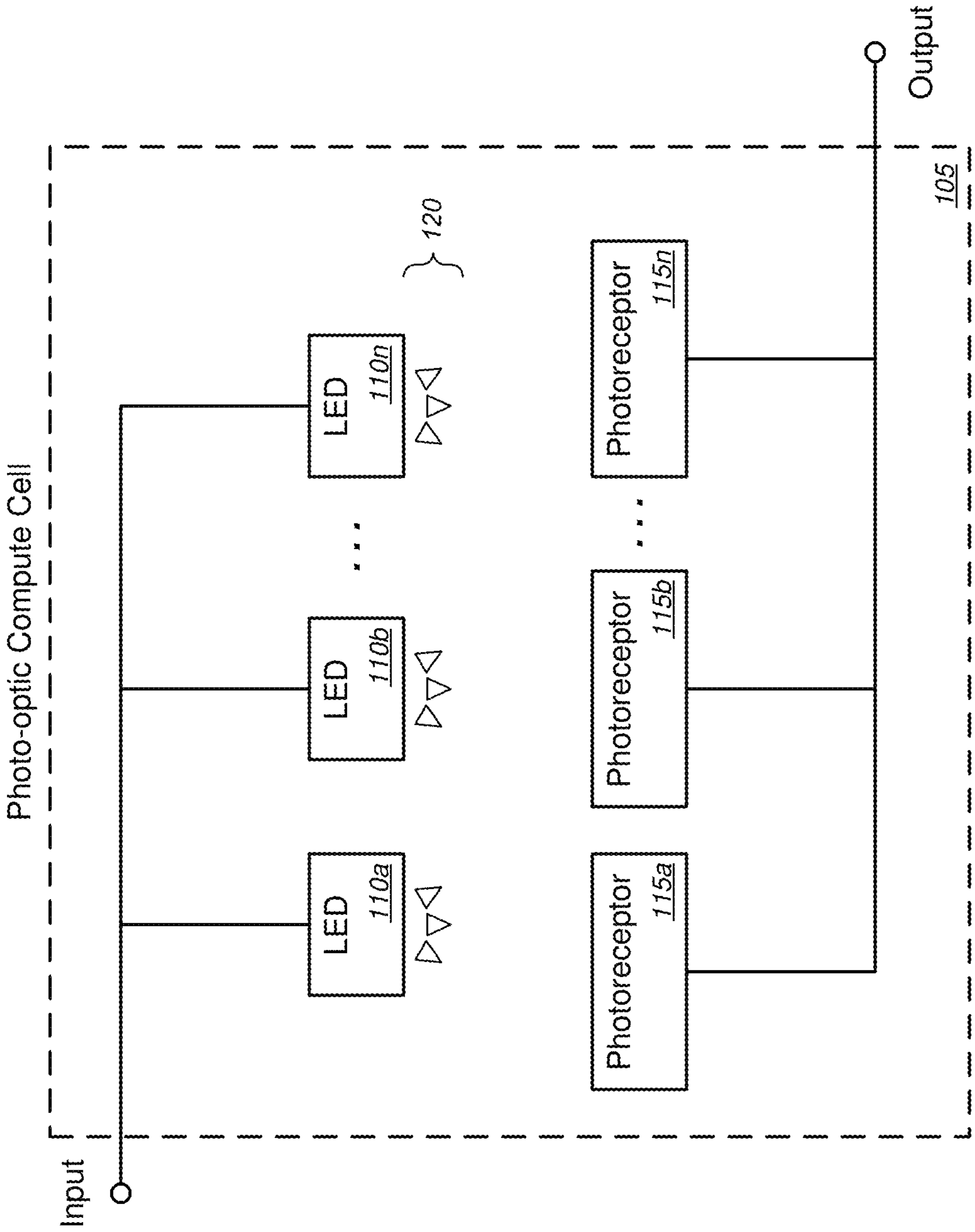
FIGS. 2A and 2B are schematic diagrams illustrating various embodiments of photo-optic compute cells that may be used for implementing transient state computing with optics.
Figure 2B:
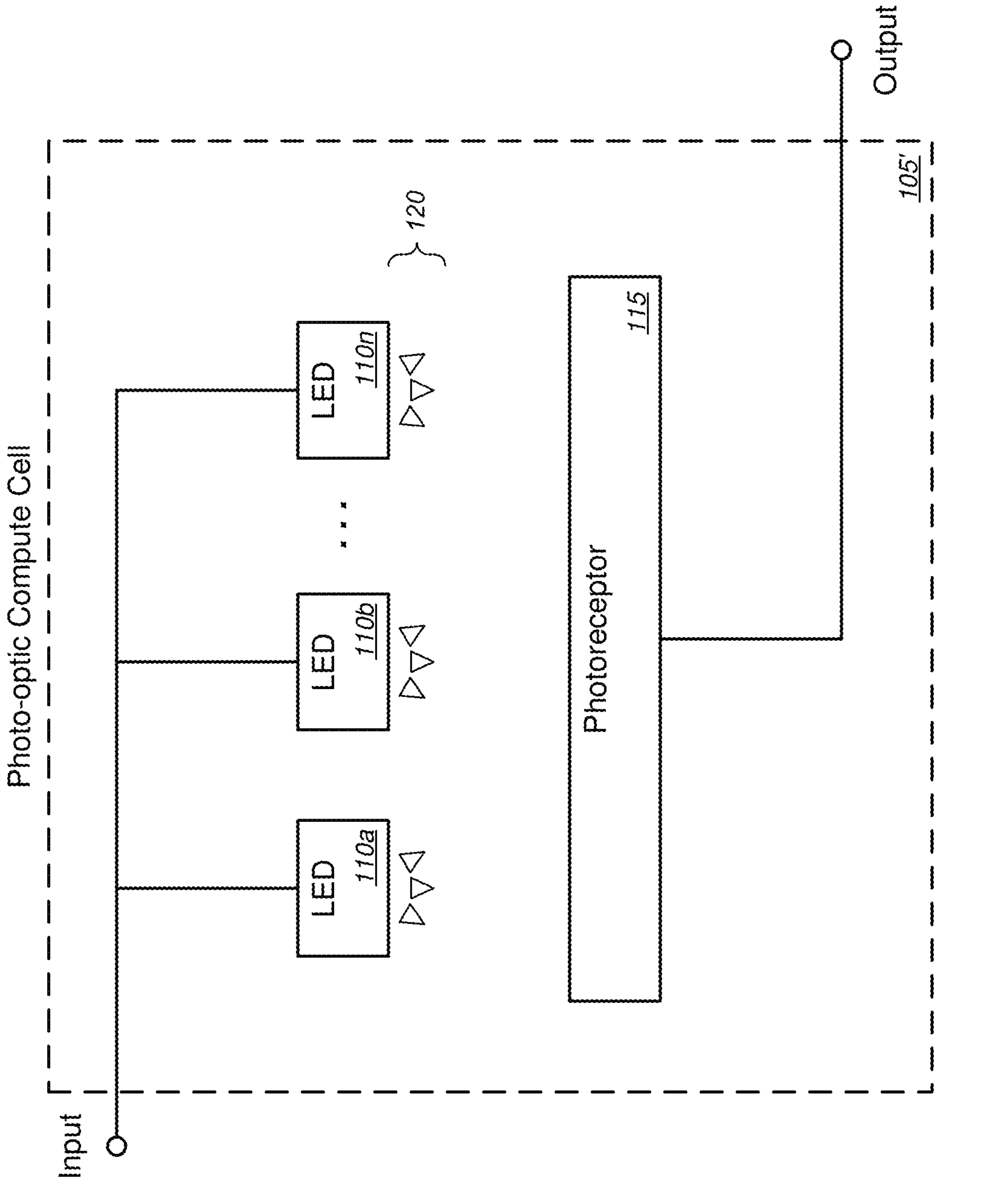
Figure 5B:
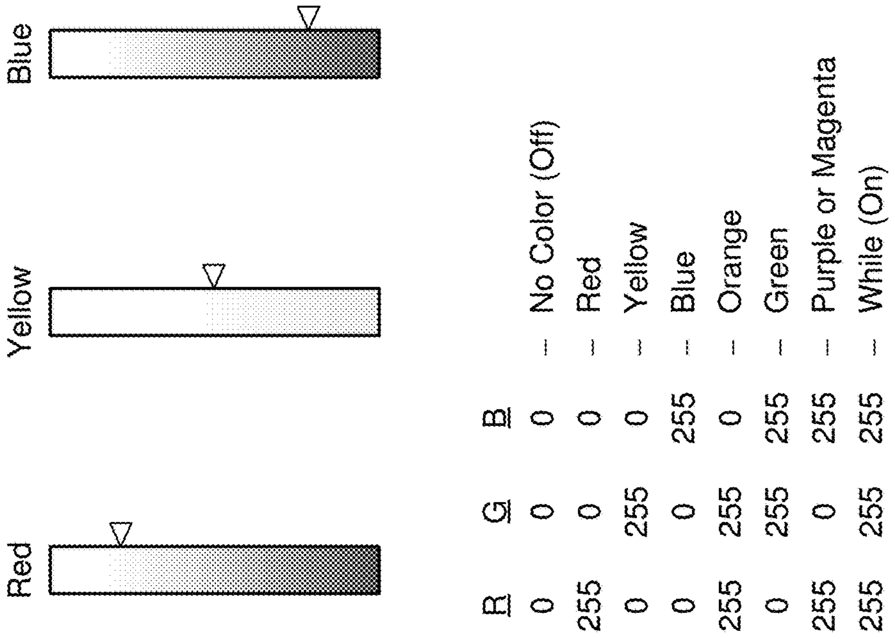
FIGS. 5A and 5B are schematic diagrams illustrating various embodiments of transient states that are possible with use of primary colors, in accordance with various embodiments.
Figure 5A:
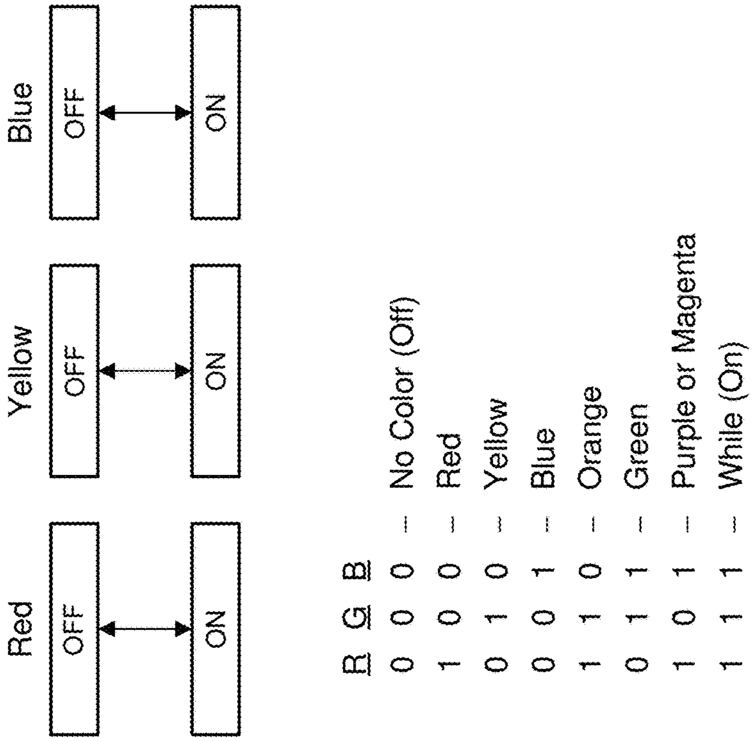

We now turn to FIGS. 2A and 2B (collectively, "FIG. 2"), which are schematic diagrams illustrating various embodiments 200 and 200' of photo-optic compute cells that may be used for implementing transient state computing with optics. In embodiment 200 of FIG. 2A, each photo-optic compute cell 105 might comprise a set of colored light emitting diodes ("LEDs") 110*a*, 110*b*, through 110*n* (collectively, "LEDs 110" or the like) and a corresponding set of photoreceptors 115*a*, 115*b*, through 115*n* (collectively, "photoreceptors 115" or the like). Each distinguishable color as detected by one of the photoreceptors might correspond to a combination of colors emitted by a set of colored LEDs (the emitted light from each LED being depicted by triangular-shaped arrows 120 in FIG. 2), each distinguishable color representing a value referred to herein as a "chromabit value." In some embodiments, each set of colored LEDs might comprise three differently colored LEDs. In some cases, the three differently colored LEDs might comprise a red LED, a yellow LED, and a blue LED, as depicted and described, e.g., in FIGS. 5A and 5B as primary colors. According to some embodiments, each set of colored LEDs need not be the specific primary colors as shown in FIGS. 5A and 5B, but may comprise three or more (in some cases, four or more) of a red LED, an orange LED, a yellow LED, a green LED, a cyan LED, a blue LED, or a violet LED, and/or the like.

Referring to embodiment 200' of FIG. 2B, rather than a set of photoreceptors 115*a*, 115*b*, through 115*n*, a single photoreceptor 115 might be used to detect light emitted from all of the set of colored LEDs 110*a*, 110*b*, through 110*n*. In embodiments 200 and/or 200', each photoreceptor 115 might include, but is not limited to, one of a phototransistor (as depicted and described below with respect to FIG. 4, or the like) or a set of photoresistors and an array of transistors (as depicted and described below with respect to FIG. 3, or the like).

Each photo-optic compute cell 105 or 105' as described herein would replace a conventional arithmetic logic unit ("ALU") that performs bitwise logic operations, for instance. Because each photo-optic compute cell 105 or 105' uses at least three colored LEDs, at least base-8 logic operations can be achieved by each compute cell 105 or 105' compared with the base-2 or bitwise logic operations that conventional (e.g., silicon-based or binary) computing devices are capable of. That is, in a binary or bitwise logic system, there are 2 possible states (i.e., a "0" state or a "1" state), thus it capable of performing base-2 operations. In contrast, a three colored LED—based photo-optic compute cell, as described herein and at its most basic level, comprises for each distinct colored LED (e.g., a primary color: red, yellow, and blue; or the like) two distinct states (i.e., an "on" state and an "off" state), which as illustrated in FIG. 5A results in 8 possible states (which might correspond to binary values or states "000," "100," "010," "001," "110," "011," "101," and "111"; or the like). In some cases, as described below, depending on the sensitivity of the photoreceptors used in each photo-optic compute cell, base-27 (e.g., for 3 colored LEDs each having 3 states (i.e., a "fully on" state, a "half on" state, and a "fully off" state), or the like), base-125 (e.g., for 3 colored LEDs each having 5 states (i.e., a "fully on" state, a "three-quarters on" state," a "half on" state, a "quarter on" state, and a "fully off" state), or the like), base-216 (e.g., for 3 colored LEDs each having 6 states (i.e., a "fully on" state, an "80% on" state," a "60% on" state, a "40% on" state, a "20% on" state, and a "fully off" state), or the like), base-4096 (e.g., for 3 colored LEDs each having 16 states, or the like), base-16777216 (e.g., for 3 colored LEDs each having 256 states, or the like), or more logic operations can be achieved by each compute cell. Other base values can also be used based on the three color configuration. For photo-optic compute cells having four or more colored LEDs, the base number of calculations can be further increased, thereby increasing the computational capabilities of the computing system.

Compared to the simplistic registers and control units of conventional base-2 or binary computing systems, however, more sophisticated registers and control units (and corresponding memory) would have to be implemented to operate the photo-optic compute cells and thus to operate the chromatic transient state computing systems. Regardless, the potential of such chromatic transient state computing systems vastly overshadow the capabilities of binary computing systems, and also quantum computing systems (which although having more states than binary systems present issues including, but not limited to, cost in manufacturing, cost to operate (e.g., some quantum computing systems require power to cool a qubit to 10 times colder than interstellar space in order to tip a qubit or to change states, etc.), scalability, issues with detection that might affect states, etc.). In contrast to quantum computing systems, chromatic transient state computing systems can use existing parts (e.g., LEDs, photoreceptors, common electronic circuit components, etc.), thus allowing for low-cost, low-power, scalable high-level computing solutions. More importantly, the chromatic transient state computing system described herein (also referred to as a "photo-optic CPU"), requires significantly less power compared with both conventional binary computing systems and currently available quantum computing systems, while providing the capability of using existing logic while also maintaining multiple Boolean states simultaneously. In some cases, individual LEDs might be used in the circuit to produce the chromatic transient state computing device. Alternatively, surface-mount device ("SMD") LEDs might be used instead, thereby further decreasing the size or footprint of each compute cell. Custom designs using SMD LEDs might also be utilized. In some instances, each photo-optic compute cell might be encased in containers or semiconductor layers to block light and thus prevent cross-talk between or among adjacent compute cells.

The photo-optic compute cell 105 or 105' might correspond to each of the compute cells **105*a*-105*n* of chromatic transient state computing system 100 of FIG. 1, and the description of compute cells 105*a*-105*n* are applicable to the corresponding compute cell 105 or 105' of embodiment 200 or 200'**, respectively.

Figure 3:
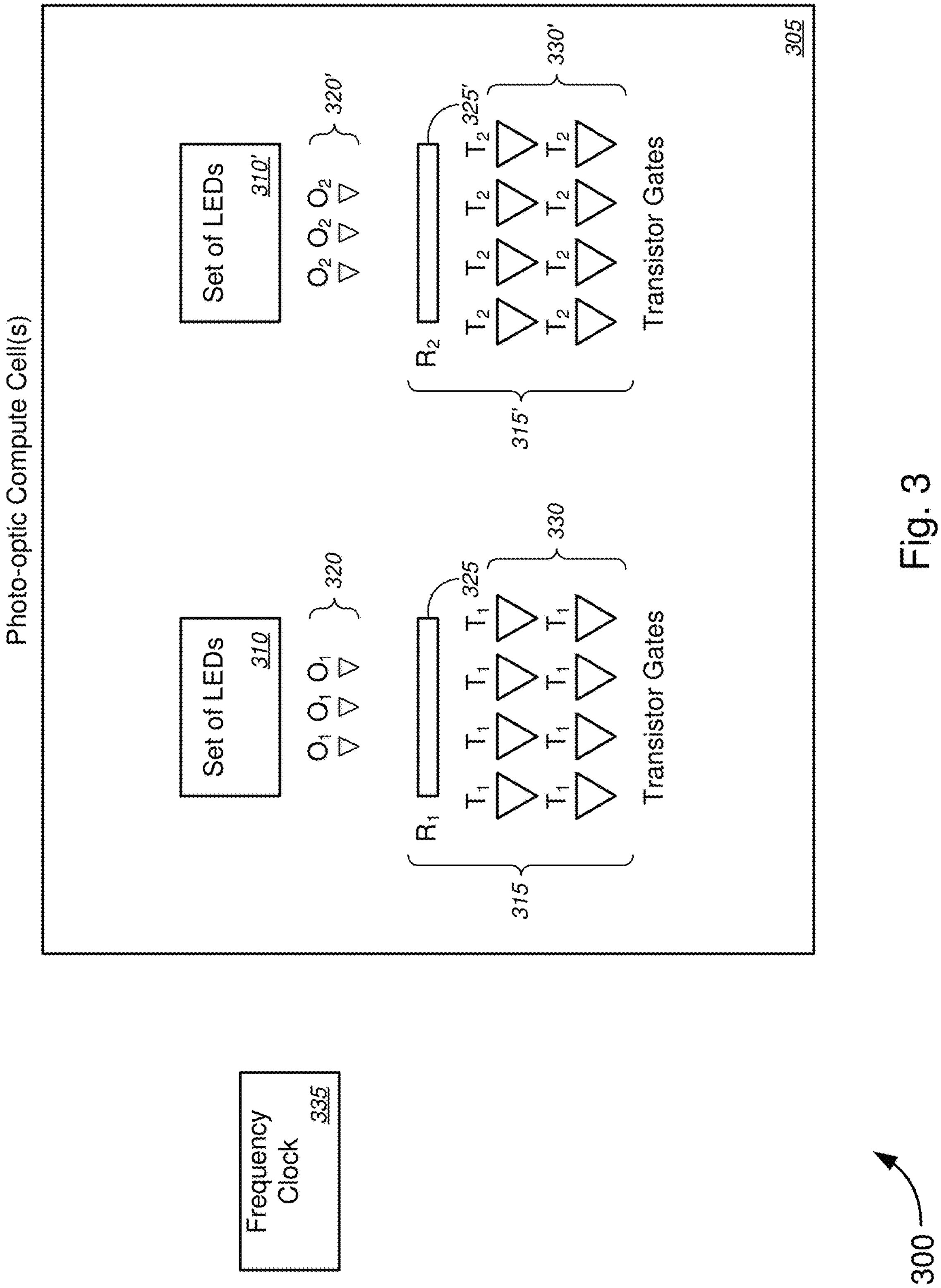
FIG. 3 is a schematic diagram illustrating an embodiment of a system for implementing transient state computing with optics.

FIG. 3 is a schematic diagram illustrating an embodiment of a system 300 for implementing transient state computing with optics.

In the non-limiting embodiment of system 300 of FIG. 3, photo-optic compute cell(s) 305 might comprise one or more sets of colored LEDs 310 (in the example of FIG. 3, two sets of colored LEDs 310 and 310' are depicted, although the various embodiments are not so limited and any number of sets of colored LEDs 310 may be used per compute cell 305). Each set of colored LEDs might comprise three or more differently colored LEDs (three are shown in the example of FIG. 3). In some embodiments, each set of colored LEDs might include, without limitation, three or more (in some cases, four or more) of a red LED, an orange LED, a yellow LED, a green LED, a cyan LED, a blue LED, or a violet LED, and/or the like. Light emitted from each colored LED from the first set of LEDs 310 (denoted, "$O_1$"; also denoted reference numeral 320) might be received by a photoreceptor 315, which might comprise a first photoresistor 325 (also denoted, "$R_1$") and an array of transistor gates 330 (also denoted, "$T_1$"). The array of transistor gates 330 might communicatively couple to photoresistor 325. Likewise, light emitted from each colored LED from the second set of LEDs 310' (denoted, "$O_2$"; also denoted reference numeral 320') might be received by a photoreceptor 315', which might comprise a second photoresistor 325' (also denoted, "$R_2$") and an array of transistor gates 330' (also denoted, "$T_2$"). The array of transistor gates 330' might communicatively couple to photoresistor 325'. In some embodiments, system 300 might further comprise frequency clock(s) 335, which might be used to synchronize emission and reception/detection of light from each of the set of LEDs 310 or 310' (or from each LED of the set of LEDs 310 or 310').

The photo-optic compute cell(s) 305 might correspond to each of the compute cells **105*a*-105*n* of chromatic transient state computing system 100 of FIG. 1, and the description of compute cells 105*a*-105*n* are applicable to the corresponding photo-optic compute cell(s) 305 of system 300 of FIG. 3, respectively. The photo-optic compute cell(s) 305 might also correspond to the photo-optic compute cell 105 or 105' of embodiment 200 or 200', and the description of the photo-optic compute cell 105 or 105' of embodiment 200 or 200' are applicable to the corresponding photo-optic compute cell(s) 305 of system 300 of FIG. 3**, respectively.

Figure 4:
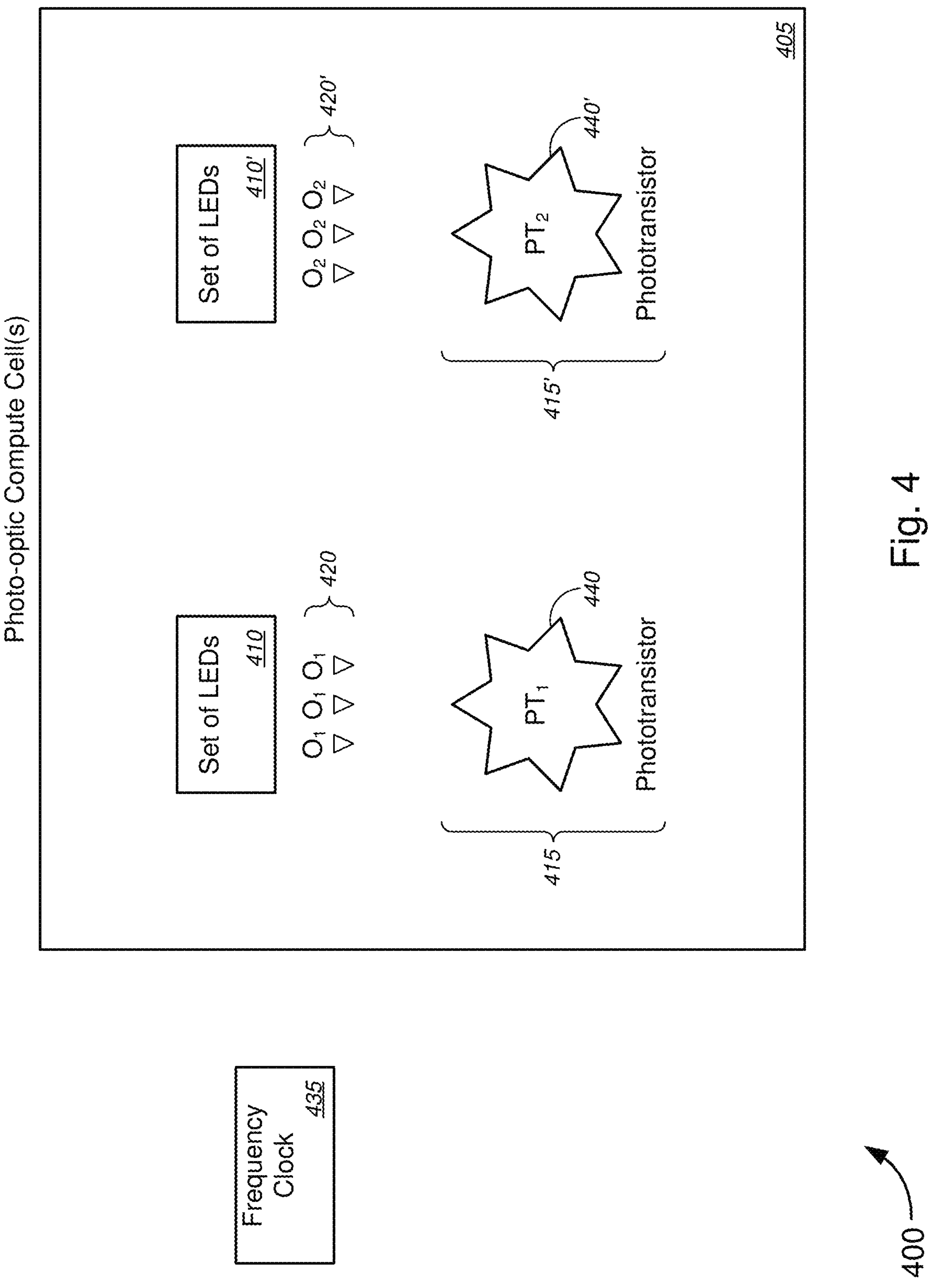
FIG. 4 is a schematic diagram illustrating another embodiment of a system for implementing transient state computing with optics.

FIG. 4 is a schematic diagram illustrating another embodiment of a system 400 for implementing transient state computing with optics.

In the non-limiting embodiment of system 400 of FIG. 4, photo-optic compute cell(s) 405 might comprise one or more sets of colored LEDs 410 (in the example of FIG. 4, two sets of colored LEDs 410 and 410' are depicted, although the various embodiments are not so limited and any number of sets of colored LEDs 410 may be used per compute cell 405). Each set of colored LEDs might comprise three or more differently colored LEDs (three are shown in the example of FIG. 4). In some embodiments, each set of colored LEDs might include, without limitation, three or more (in some cases, four or more) of a red LED, an orange LED, a yellow LED, a green LED, a cyan LED, a blue LED, or a violet LED, and/or the like. Light emitted from each colored LED from the first set of LEDs 410 (denoted, "$O_1$"; also denoted reference numeral 420) might be received by a photoreceptor 415, which might comprise a first phototransistor 440 (also denoted, "$PT_1$"). The first phototransistor 440 might receive the colored light 420 from the first set of LEDs 410, and might output one or more output values. Likewise, light emitted from each colored LED from the second set of LEDs 410' (denoted, "$O_2$"; also denoted reference numeral 420') might be received by a photoreceptor 415', which might comprise a second phototransistor 440' (also denoted, "$PT_2$"). The second phototransistor 440' might receive the colored light 420' from the second set of LEDs 410', and might output one or more output values. In some embodiments, system 400 might further comprise frequency clock(s) 435, which might be used to synchronize emission and reception/detection of light from each of the set of LEDs 410 or 410' (or from each LED of the set of LEDs 410 or 410').

The photo-optic compute cell 405 might correspond to each of the compute cells **105*a*-105*n* of chromatic transient state computing system 100 of FIG. 1, and the description of compute cells 105*a*-105*n* are applicable to the corresponding compute cell 405 of system 400 of FIG. 4, respectively. The photo-optic compute cell(s) 405 might also correspond to the photo-optic compute cell 105 or 105' of embodiment 200 or 200', and the description of the photo-optic compute cell 105 or 105' of embodiment 200 or 200' are applicable to the corresponding photo-optic compute cell(s) 405 of system 400 of FIG. 4**, respectively.

FIGS. 5A and 5B (collectively, "FIG. 5") are schematic diagrams illustrating various embodiments 500 and 500' of transient states that are possible with use of primary colors. Although three primary colors are depicted in FIG. 5, the various embodiments are not so limited, and any number and type of colors can be used for implementing transient state computing with optics, so long as the photoreceptors can distinguish among states corresponding to one or more combinations of these colors. With reference to FIG. 5, a three-colored set of light emitting diodes ("LEDs"), which in this case might include primary colors: red, yellow, and blue. According to some embodiments, however, each set of colored LEDs might comprise three or more (in some cases, four or more) of a red LED, an orange LED, a yellow LED, a green LED, a cyan LED, a blue LED, or a violet LED, and/or the like.

In embodiment 500 of FIG. 5A, for example, each colored LED might have two states: on and off. When all three primary LEDs are set to off (which might correspond to a bit state or bit value of "0"), no colors are emitted. When the red LED is set to the on state (which might correspond to a bit state or bit value of "1"), while the yellow and blue LEDs are each set to the off state (which might correspond to a bit state or bit value of "0"), the color emitted may be red. When the yellow LED is set to the on state (which might correspond to a bit state or bit value of "1"), while the red and blue LEDs are each set to the off state (which might correspond to a bit state or bit value of "0"), the color emitted may be yellow. When the blue LED is set to the on state (which might correspond to a bit state or bit value of "1"), while the yellow and red LEDs are each set to the off state (which might correspond to a bit state or bit value of "0"), the color emitted may be blue. When the red and yellow LEDs are each set to the on state (which might correspond to a bit state or bit value of "1"), while the blue LED is set to the off state (which might correspond to a bit state or bit value of "0"), the color emitted may be orange. When the yellow and blue LEDs are each set to the on state (which might correspond to a bit state or bit value of "1"), while the red LED is set to the off state (which might correspond to a bit state or bit value of "0"), the color emitted may be green. When the red and blue LEDs are each set to the on state (which might correspond to a bit state or bit value of "1"), while the yellow LED is set to the off state (which might correspond to a bit state or bit value of "0"), the color emitted may be purple or magenta. When all three primary LEDs are set to on (which might correspond to a bit state or bit value of "1"), the color emitted may be white.

In some embodiments, each colored LED might have a range of states. In embodiment 500' of FIG. 5B, for instance, each colored LED might have a range between 0 and 255, resulting in 256 possible states, in some cases, each possible state representing a possible chromabit value. When all three primary LEDs are set to the fully off state (which might correspond to a bit state or bit value of "0"), no colors are emitted. When the red LED is set to the fully on state (which might correspond to a bit state or bit value of "255"), while the yellow and blue LEDs are each set to the fully off state (which might correspond to a bit state or bit value of "0"), the color emitted may be red. When the yellow LED is set to the fully on state (which might correspond to a bit state or bit value of "255"), while the red and blue LEDs are each set to the fully off state (which might correspond to a bit state or bit value of "0"), the color emitted may be yellow. When the blue LED is set to the fully on state (which might correspond to a bit state or bit value of "255"), while the yellow and red LEDs are each set to the fully off state (which might correspond to a bit state or bit value of "0"), the color emitted may be blue. When the red and yellow LEDs are each set to the fully on state (which might correspond to a bit state or bit value of "255"), while the blue LED is set to the fully off state (which might correspond to a bit state or bit value of "0"), the color emitted may be orange. When the yellow and blue LEDs are each set to the fully on state (which might correspond to a bit state or bit value of "255"), while the red LED is set to the fully off state (which might correspond to a bit state or bit value of "0"), the color emitted may be green. When the red and blue LEDs are each set to the fully on state (which might correspond to a bit state or bit value of "255"), while the yellow LED is set to the fully off state (which might correspond to a bit state or bit value of "0"), the color emitted may be purple or magenta. When all three primary LEDs are set to the fully on state (which might correspond to a bit state or bit value of "255"), the color emitted may be white.

Although not shown, the transient states between 0 and 255 for each primary color, resulting in 254 transient states per primary color. As such, the embodiment 500', having three primary colors each having 256 states, would have a total of 16,777,216 possible states, each possible state representing a possible chromabit value. In the example of FIG. 5B', for instance, the triangular pointers beside the graduated range for each primary color might point to one of the 256 states. For example, in FIG. 5B, the pointer beside the graduated range for the red color might correspond to a bit state or bit value of "55," while the pointer beside the graduated range for the yellow color might correspond to a bit state or bit value of "127," and the pointer beside the graduated range for the blue color might correspond to a bit state or bit value of "200."

In alternative embodiments, although not shown in FIG. 5B, each of the primary colors might have 3 possible states (i.e., a "fully on" state, a "half on" state, and a "fully off" state, or the like), resulting in a total of 27 possible states, each possible state representing a possible chromabit value. Alternatively, each of the primary colors might have 5 possible states (i.e., a "fully on" state, a "three-quarters on" state," a "half on" state, a "quarter on" state, and a "fully off" state, or the like), resulting in a total of 125 possible states, each possible state representing a possible chromabit value. In an alternative embodiment, each of the primary colors might have 6 possible states (i.e., a "fully on" state, an "80% on" state," a "60% on" state, a "40% on" state, a "20% on" state, and a "fully off" state, or the like), resulting in a total of 216 possible states, each possible state representing a possible chromabit value. In another alternative embodiment, each of the primary colors might have 16 possible states, resulting in a total of 4,096 possible states, each possible state representing a possible chromabit value. Alternatively, each of the primary colors might have 4,096 possible states, resulting in a total of 68,719,476,736 possible states, each possible state representing a possible chromabit value. In yet another alternative embodiment, each of the primary colors might have 16,777,216 possible states, resulting in a total of 4,722,366,482,869,645,213,696 possible states, each possible state representing a possible chromabit value. The sensitivity of the photoreceptor(s)—which might each include, but is not limited to, one of a phototransistor or a set of photoresistors and an array of transistors, and/or the like—might provide the capability to sense or detect the possible chromabit values, and the number of total possible states may be limited to such capabilities. With higher possible states of each LED or of each set of LEDs, more sophisticated registers and control units (and corresponding memory) would have to be implemented to operate the photo-optic compute cells and thus to operate the chromatic transient state computing systems, as discussed above.

Figure 6:
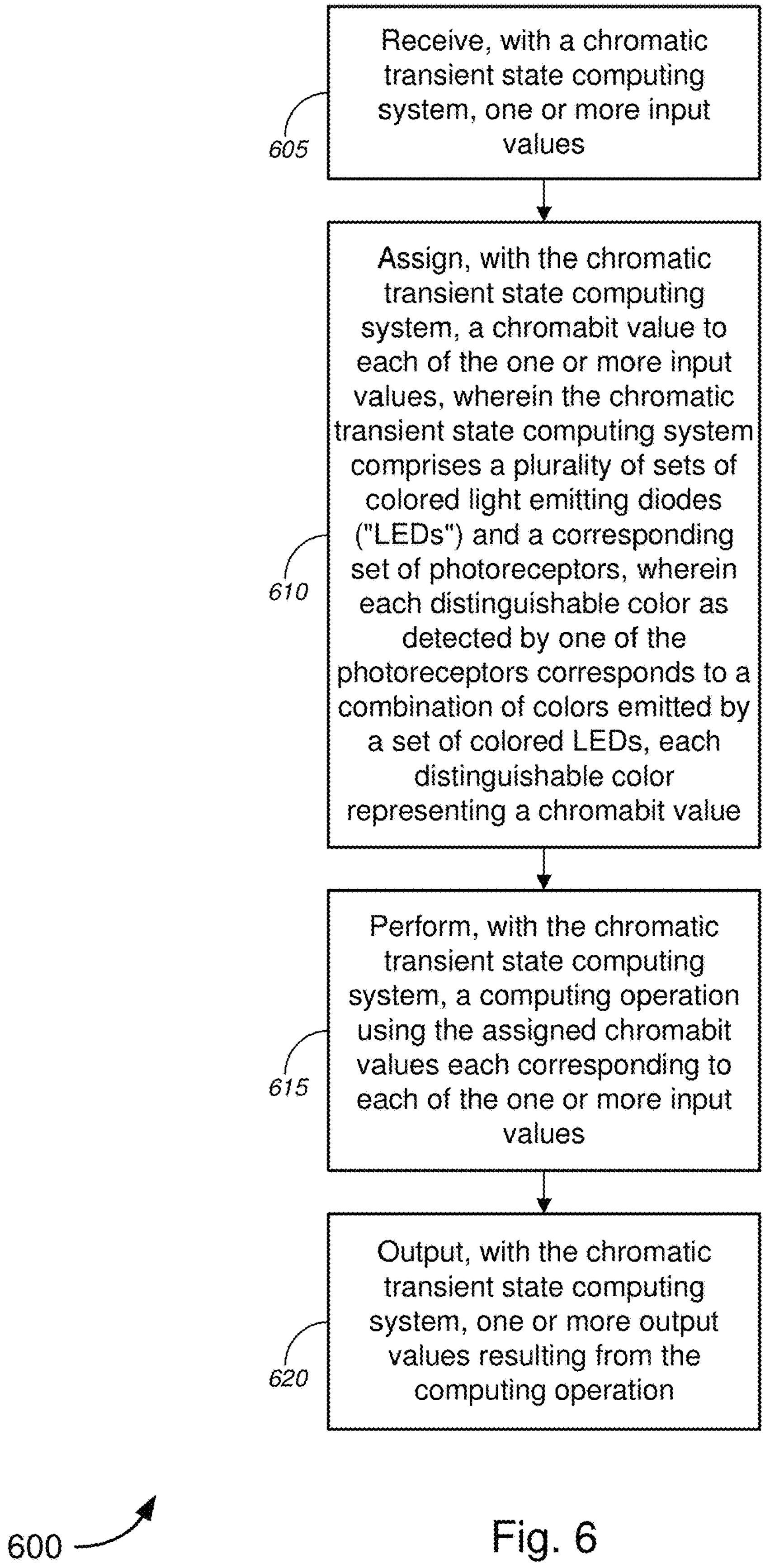
FIG. 6 is a flow diagram illustrating a method for implementing transient state computing with optics, in accordance with various embodiments.

FIG. 6 is a flow diagram illustrating a method 600 for implementing transient state computing with optics, in accordance with various embodiments.

While the techniques and procedures are depicted and/or described in a certain order for purposes of illustration, it should be appreciated that certain procedures may be reordered and/or omitted within the scope of various embodiments. Moreover, while the method 600 illustrated by FIG. 6 can be implemented by or with (and, in some cases, are described below with respect to) the systems or embodiments 100, 200, 200', 300, 400, 500, and 500' of FIGS. 1, 2A, 2B, 3, 4, 5A, and 5B, respectively (or components thereof), such methods may also be implemented using any suitable hardware (or software) implementation. Similarly, while each of the systems or embodiments 100, 200, 200', 300, 400, 500, and 500' of FIGS. 1, 2A, 2B, 3, 4, 5A, and 5B, respectively (or components thereof), can operate according to the method 600 illustrated by FIG. 6 (e.g., by executing instructions embodied on a computer readable medium), the systems or embodiments 100, 200, 200', 300, 400, 500, and 500' of FIGS. 1, 2A, 2B, 3, 4, 5A, and 5B, respectively (or components thereof) can each also operate according to other modes of operation and/or perform other suitable procedures.

In the non-limiting embodiment of FIG. 6, method 600, at block 605, might comprise receiving, with a chromatic transient state computing system, one or more input values. At block 610, method 600 might comprise assigning, with the chromatic transient state computing system, a chromabit value to each of the one or more input values. The chromatic transient state computing system might include, without limitation, a plurality of sets of colored light emitting diodes ("LEDs") and a corresponding set of photoreceptors. Each distinguishable color as detected by one of the photoreceptors might correspond to a combination of colors emitted by a set of colored LEDs, each distinguishable color representing a chromabit value. In some embodiments, the photoreceptors might each comprise one of a phototransistor or a set of photoresistors and an array of transistors, and/or the like.

Method 600 might further comprise performing, with the chromatic transient state computing system, a computing operation using the assigned chromabit values each corresponding to each of the one or more input values (block 615) and outputting, with the chromatic transient state computing system, one or more output values resulting from the computing operation (block 620).

In some embodiments, each set of colored LEDs might comprise three differently colored LEDs. In some cases, the three differently colored LEDs comprise a red LED, a yellow LED, and a blue LED. In some instances, each set of colored LEDs might represent 8 possible states, each possible state representing a possible chromabit value (e.g., as illustrated and described above with respect to FIG. 5A, or the like).

According to some embodiments, intensity of each colored LED is controllable based on input current, wherein the range of light intensity produced by changing input current to each colored LED results in a series of distinguishable colors each representing a chromabit value (e.g., as illustrated and described above with respect to FIG. 5B, or the like). In some instances, each set of colored LEDs might represent 216 possible states, each possible state representing a possible chromabit value.

In some embodiments, the light intensity for each colored LED might range between 0 and 15 (representing a fully on state, a fully off state, and 14 transient states between). In other words, each set of colored LEDs (having three colored LEDs) might represent 4,096 possible states, each possible state representing a possible chromabit value (not shown). Alternatively, the light intensity for each colored LED might range between 0 and 255 (representing a fully on state, a fully off state, and 254 transient states between). In other words, each set of colored LEDs (having three colored LEDs) might represent 16,777,216 possible states, each possible state representing a possible chromabit value (e.g., as illustrated and described above with respect to FIG. 5B, or the like). In some cases, the light intensity for each colored LED might allow for a greater range, allowing for a greater number of possible states, each possible state representing a possible chromabit value (not shown).

In some aspects, each set of colored LEDs might include, without limitation, four or more of a red LED, an orange LED, a yellow LED, a green LED, a cyan LED, a blue LED, or a violet LED, and/or the like.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

performing, with a chromatic transient state computing system, a computing operation using assigned chromabit values each corresponding to each of one or more input values, wherein the chromatic transient state computing system comprises a plurality of sets of colored light emitting diodes ("LEDs") and a corresponding set of photoreceptors, wherein each distinguishable color as detected by one of the photoreceptors corresponds to a combination of colors emitted by a set of colored LEDs, each distinguishable color representing a chromabit value.

2. The method of claim 1, wherein each set of colored LEDs comprises three differently colored LEDs.

3. The method of claim 2, wherein the three differently colored LEDs comprise a red LED, a yellow LED, and a blue LED.

4. The method of claim 1, wherein each set of colored LEDs represents 8 possible states, each possible state representing a possible chromabit value.

5. The method of claim 1, wherein intensity of each colored LED is controllable based on input current, wherein the range of light intensity produced by changing input current to each colored LED results in a series of distinguishable colors each representing a chromabit value.

6. The method of claim 5, wherein each set of colored LEDs represents 216 possible states, each possible state representing a possible chromabit value.

7. The method of claim 5, wherein each set of colored LEDs represents 4,096 possible states, each possible state representing a possible chromabit value.

8. The method of claim 5, wherein each set of colored LEDs represents 16,777,216 possible states, each possible state representing a possible chromabit value.

9. The method of claim 1, wherein each set of colored LEDs comprises four or more of a red LED, an orange LED, a yellow LED, a green LED, a cyan LED, a blue LED, or a violet LED.

10. The method of claim 1, wherein the photoreceptors each comprises one of a phototransistor or a set of photoresistors and an array of transistors.

11. A chromatic transient state computing system, comprising:

a plurality of sets of colored light emitting diodes ("LEDs"); and a corresponding set of photoreceptors;

wherein a set of computing instructions causes the chromatic transient state computing system to:

perform a computing operation using assigned chromabit values each corresponding to each of one or more input values, wherein the chromatic transient state computing system comprises a plurality of sets of colored light emitting diodes ("LEDs") and a corresponding set of photoreceptors, wherein each distinguishable color as detected by one of the photoreceptors corresponds to a combination of colors emitted by a set of colored LEDs, each distinguishable color representing a chromabit value.

12. The chromatic transient state computing system of claim 11, wherein each set of colored LEDs comprises three differently colored LEDs.

13. The chromatic transient state computing system of claim 12, wherein the three differently colored LEDs comprise a red LED, a yellow LED, and a blue LED.

14. The chromatic transient state computing system of claim 11, wherein each set of colored LEDs represents 8 possible states, each possible state representing a possible chromabit value.

15. The chromatic transient state computing system of claim 11, wherein intensity of each colored LED is controllable based on input current, wherein the range of light intensity produced by changing input current to each colored LED results in a series of distinguishable colors each representing a chromabit value.

16. The chromatic transient state computing system of claim 15, wherein each set of colored LEDs represents 216 possible states, each possible state representing a possible chromabit value.

17. The chromatic transient state computing system of claim 15, wherein each set of colored LEDs represents 4,096 possible states, each possible state representing a possible chromabit value.

18. The chromatic transient state computing system of claim 15, wherein each set of colored LEDs represents 16,777,216 possible states, each possible state representing a possible chromabit value.

19. The chromatic transient state computing system of claim 11, wherein each set of colored LEDs comprises four or more of a red LED, an orange LED, a yellow LED, a green LED, a cyan LED, a blue LED, or a violet LED.

20. The chromatic transient state computing system of claim 11, wherein the photoreceptors each comprises one of a phototransistor or a set of photoresistors and an array of transistors.

* * * * *